W. P. HAMMOND.

INDICATING SIGNAL FOR VEHICLES.

APPLICATION FILED JULY 7, 1917.

Reissued Sept. 25, 1917.

14,367.

Inventor

William P. Hammond

UNITED STATES PATENT OFFICE.

WILLIAM P. HAMMOND, OF PASSAIC, NEW JERSEY.

INDICATING-SIGNAL FOR VEHICLES.

14,367. Specification of Reissued Letters Patent. Reissued Sept. 25, 1917.

Original No. 1,199,545, dated September 26, 1916, Serial No. 599,527, filed December 27, 1910. Application for reissue filed July 7, 1917. Serial No. 179,293.

*To all whom it may concern:*

Be it known that I, WILLIAM P. HAMMOND, a citizen of the United States, and a resident of Passaic, county of Passaic, and State of New Jersey, have invented certain new and useful Improvements in Indicating-Signals for Vehicles, of which the following, taken in connection with the accompanying sheet of drawing, is a concise and complete description.

My invention relates to indicating devices for use in connection with road vehicles to indicate the direction in which a vehicle is about to turn.

The object of my invention is to provide a simple device of this character having an indicating symbol or symbols and means for illuminating the same in such a manner as to indicate either one of two directions.

Referring to the accompanying drawings, in which I have illustrated one preferable embodiment of my invention, I will proceed to describe the same, it being understood that I do not limit or restrict myself to the precise construction illustrated, but, on the contrary, may depart therefrom and construct the device differently and still come within the spirit and scope of my invention.

Figure 1:
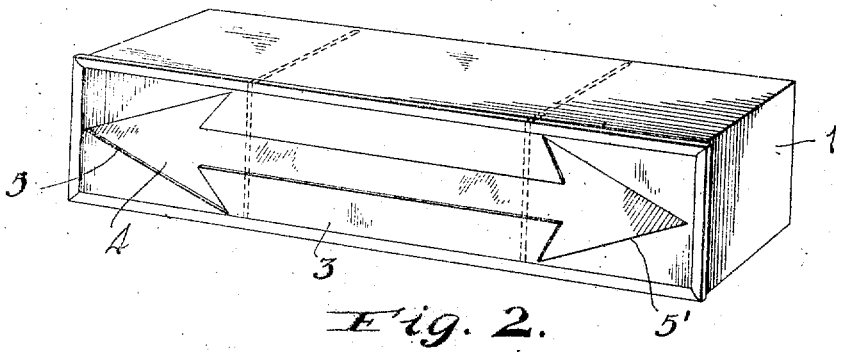
Figure 2:
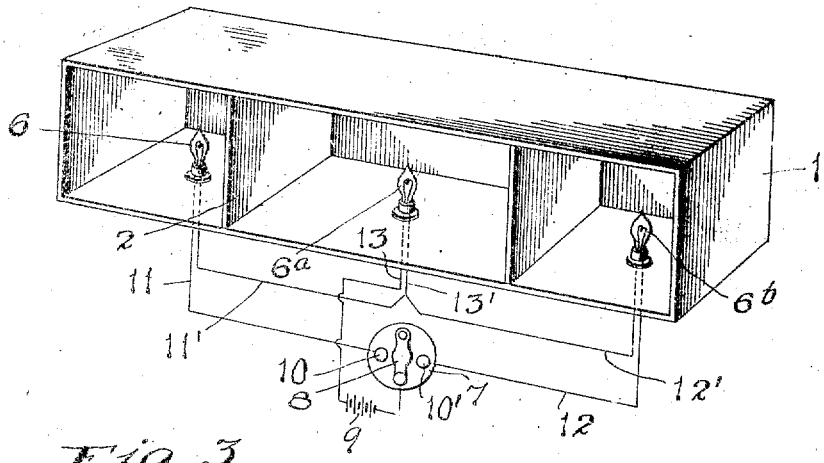
Figure 3:
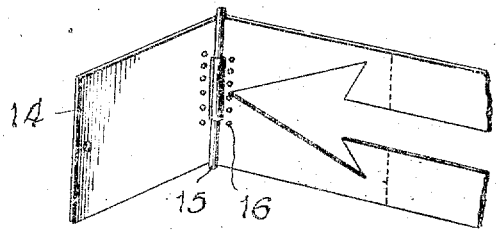

Figure 1 is a perspective view of one embodiment of my invention. Fig. 2 is a similar view with the front removed. Fig. 3 is a modification of my invention.

Like reference numerals indicate like parts throughout the respective views, and —1— indicates an oblong box-like structure divided by partitions —2— into three compartments.

—3— indicates a removable front having cut therefrom a portion of its body, the configuration of the cutout portion taking the form of an indicating symbol, here shown as a double headed arrow, the spear shaped heads being indicated at —5— and —5′—. (While I have illustrated an arrow indicating symbol, it is apparent that other different symbols may be employed, such, for instance, as a hand or hand having the index finger pointing to indicate the direction in which the vehicle is about to turn). Behind the front —3— and covering the cutout portion thereof is a red glass —4—. Within each compartment is provided an illuminating device preferably as shown here, small electric bulbs —6—, —6ᵃ—, —6ᵇ—. These electric lights are of small voltage and may be supplied with electric current from the ordinary dry batteries —9— that are carried by automobiles for ignition purposes. The lamp circuits are controlled by a suitable switch —7— having a two-throw switch blade —8— adapted to coöperate with contacts —10— and —10′— to direct the current to the lights. These indicating devices are intended to be attached to both the front and rear of the vehicle, and are operated in substantially the following manner, to indicate to the drivers of other vehicles and pedestrians the direction in which a turn is to be made. By turning a switch blade onto contact —10— the current from battery —9— is sent through circuits —11—, —11′—, —13′— and —13—, illuminating lamps —6— and —6ᵃ— bringing into sight the arrow or symbol pointing in direction to the left, assuming that the device is attached to the rear of the vehicle. When the switch blade —8— is thrown over onto contact —10′— light —6— will go out and —6ᵇ— will illuminate and the circuit will then be through —12—, —12′—, —13′— and —13—. Under this operation the arrow or symbol will point to the right, indicating that a turn to the right is contemplated.

In Fig. 3 I have shown a modification in which I dispense with the lamps —6— and —6ᵇ—, and control the arrow heads or symbols by mechanically operated wings or blinds —14— which are pivoted at —15—. These blinds are provided with springs —16— which normally hold the blind in closed position over the arrow heads. The blinds are operated by a pull upon suitable operating cords attached thereto, and the single light behind is sufficient to illuminate the whole of the signal indication. When the operating cord is released, the blind will close under action of the spring —16—.

Having thus described my invention, what I claim as new herein and desire to secure by Letters Patent, is:—

1. A direction indicator for vehicles, including a cover plate provided with a plurality of independent transparent areas, complemental design elements upon the transparent areas, said design elements having such a relation to each other that selected sets thereof taken independently form complete direction indicating designs, independent illuminating means behind the respective areas of the transparent plate, means for confining the light from each illuminating means to the particular area of the transparent plate, and selective means for controlling the independent illuminating means whereby any selected set of the design elements can be illuminated to indicate the desired direction.

2. A direction indicator for vehicles, including a cover plate provided with a plurality of independent transparent areas, a continuous design extending over the various transparent areas, the various elements of the design being of a complemental nature and having such a relation to each other that selective sets thereof taken independently form complete direction indicating designs, independent illuminating means behind the respective transparent areas of the cover plate, means for confining the light from each illuminating means to the particular area of the cover plate, and selective means for controlling the independent illuminating means whereby any selected set of the element of the design can be illuminated.

3. A direction indicator for vehicles and the like including a transparent plate subdivided into a central area and end areas, said plate being provided with a unitary design extending over all of the areas and the portions thereof over the different areas having such a relation to each other that the central portion in combination with either of the end portions forms a complete direction indicating design, independent illuminating means behind the respective areas of the transparent plate, means for confining the light of each illuminating means to its particular area, and selective means for controlling the independent illuminating means whereby the central area of the transparent plate can be illuminated in combination with either one of the end areas thereof.

4. A direction indicator for vehicles and the like, including a casing, partitions dividing the casing into a central compartment and opposite end compartments, a transparent plate extending across the several compartments and having a double headed arrow marked thereon, the shaft of the arrow extending across the central compartment while the arrow heads point in opposite directions and are disposed over the opposite end compartments, independent illuminating means within the several compartments, and selective means for controlling the illuminating means to illuminate the central compartment in combination with either of the end compartments.

5. A signal as characterized, comprising a containing case having a cover, said cover being provided with transparent sections laterally extended and centrally united to indicate opposite lateral directions; a plurality of illuminating members for said sections; a plurality of partitions confining a central portion to exclude the light thereof from the other portions; and means for selectively illuminating the said members.

6. A signal as characterized, comprising a containing case having a cover, said cover being provided with transparent sections laterally extended and centrally united, design elements upon the transparent sections of the cover, independent illuminating means for said sections, partitions confining a central section to exclude the light thereof from the other sections, and selective means for controlling the illuminating means, the before mentioned design elements having a complemental relation so that selected sets thereof taken independently form complete direction indicating designs.

7. A signal as characterized, comprising a containing case having a cover, said cover being provided with transparent sections laterally extended and centrally united to indicate opposite lateral directions, a plurality of illuminating members for said sections; a plurality of partitions confining a central portion to exclude the light thereof from the other portions; and means for illuminating the central member and one of the side members to secure the combined symbolical effect of the designs of said sections.

8. A signal as characterized, comprising a containing case provided with sections laterally extended and centrally united and provided with designs to indicate opposite lateral directions, a plurality of illuminating members for said sections; a plurality of partitions confining a central portion to exclude the light thereof from the other portions; and means for illuminating the central member and one of the side members to secure the combined symbolical effect of the designs of said sections.

9. A signal as characterized, comprising a containing case having a cover, said cover being provided with transparent sections laterally extended and centrally united to indicate opposite lateral directions; a plurality of illuminating members for said sections, a plurality of pa titions confining a central portion to exclude the light thereof from the other portions, and means for illuminating said members so that the center member and a side member are in indicating condition simultaneously.

10. A signal as characterized, comprising a containing case provided with sections laterally extended and centrally united and provided with designs to indicate opposite lateral directions; a plurality of illuminating members for said sections; a plurality of partitions confining a central portion to exclude the light thereof from the other portions; and means for illuminating said members so that the central member and a side member are in indicating condition simultaneously.

In testimony whereof, I hereunto affix my signature in the presence of two witnesses.

WILLIAM P. HAMMOND.

Witnesses:
IRENE MANNING,
LILLIAN L. MALZER.